(12) United States Patent
Mueller

(10) Patent No.: US 9,879,883 B2
(45) Date of Patent: Jan. 30, 2018

(54) HIGH TEMPERATURE DIRECT SOLAR THERMAL CONVERSION

(71) Applicant: Mark Mueller, Oak Creek, CO (US)

(72) Inventor: Mark Mueller, Oak Creek, CO (US)

( * ) Notice: Subject to any disclaimer, the term of this patent is extended or adjusted under 35 U.S.C. 154(b) by 593 days.

(21) Appl. No.: 14/380,003

(22) PCT Filed: Jul. 1, 2013

(86) PCT No.: PCT/US2013/048903
§ 371 (c)(1),
(2) Date: Aug. 20, 2014

(87) PCT Pub. No.: WO2014/011431
PCT Pub. Date: Jan. 16, 2014

(65) Prior Publication Data
US 2015/0013665 A1    Jan. 15, 2015

Related U.S. Application Data

(60) Provisional application No. 61/669,057, filed on Jul. 7, 2012, provisional application No. 61/771,621, filed on
(Continued)

(51) Int. Cl.
*F24J 2/14* (2006.01)
*F24J 2/24* (2006.01)
(Continued)

(52) U.S. Cl.
CPC ............... *F24J 2/24* (2013.01); *F24J 2/055* (2013.01); *F24J 2/14* (2013.01); *F24J 2/26* (2013.01);
(Continued)

(58) Field of Classification Search
CPC ..................... F24J 2/14; F24J 2/24; F24J 2/26
(Continued)

(56) References Cited

U.S. PATENT DOCUMENTS

| 4,033,327 A | * | 7/1977 | Pei | ............................ F24J 2/055 |
| | | | | 126/608 |
| 4,285,394 A | * | 8/1981 | Stewart | ................... F28D 15/04 |
| | | | | 122/33 |

(Continued)

FOREIGN PATENT DOCUMENTS

WO    2011021172 A2    2/2011

OTHER PUBLICATIONS

Siddharth Arora, et al., "Thermal analysis of evacuated solar tube collectors", Journal of Petroleum and Gas Engineering vol. 2(4), pp. 74-82, Apr. 2011.
(Continued)

*Primary Examiner* — Gregory Huson
*Assistant Examiner* — Nikhil Mashruwala
(74) *Attorney, Agent, or Firm* — Ogilvie Law Firm

(57) ABSTRACT

Technical challenges of efficiently and cost-effectively deriving energy from the sun are addressed using a manifold and an array of evacuated tubes in fluid connection, in a butterfly or other planar arrangement. Tube and manifold fluid guides are plumbed for coaxial flow and/or parallel flow, and thermally protected by sleeves, stainless steel piping, and/or vacuum. Tubes are provided with a selective low emissivity coating and/or internal mirror to reduce thermal loss. The solar absorption surface of evacuated tubes may be five square meters or more, with only low-quality concentration optics, or no concentration optics used. The tubes array tracks the sun with a two-axis motion platform. Fluid operating temperatures range from 150 to 300 degrees centigrade, depending on the sunlight exposure, working fluid, and supplemental heat source if any. Fluid may circulate heat between the manifold and heat engine, cogeneration facility, and/or other module.

8 Claims, 15 Drawing Sheets

Related U.S. Application Data on Mar. 1, 2013, provisional application No. 61/803,130, filed on Mar. 19, 2013.

(51) Int. Cl.
| | |
|---|---|
| *F24J 2/05* | (2006.01) |
| *F24J 2/26* | (2006.01) |
| *F24J 2/46* | (2006.01) |
| *F24J 2/54* | (2006.01) |

(52) U.S. Cl.
CPC ........... *F24J 2/4647* (2013.01); *F24J 2/5417* (2013.01); *Y02E 10/44* (2013.01); *Y02E 10/45* (2013.01); *Y02E 10/47* (2013.01)

(58) Field of Classification Search
USPC .................................. 126/663, 670, 672, 443
See application file for complete search history.

(56) References Cited

U.S. PATENT DOCUMENTS

| | | | |
|---|---|---|---|
| 4,326,502 A | 4/1982 | Radenkovic | |
| 4,346,694 A | 8/1982 | Moan | |
| 4,554,908 A | 11/1985 | Hanlet et al. | |
| 4,823,771 A * | 4/1989 | Menning | F24J 2/243 126/563 |
| 5,509,462 A * | 4/1996 | Demko | F24J 3/083 165/155 |
| 8,602,021 B2 * | 12/2013 | Davis | F24J 2/055 126/655 |
| 8,776,782 B2 * | 7/2014 | McEntee | F24J 2/055 126/652 |
| 8,863,740 B2 * | 10/2014 | Williamson | F24J 2/32 126/643 |
| 9,068,756 B1 * | 6/2015 | Murray | F24D 11/003 |
| 9,494,339 B2 * | 11/2016 | Reid | F24J 2/055 |
| 9,726,405 B2 * | 8/2017 | Kawano | F04F 5/04 |
| 2007/0227529 A1 * | 10/2007 | Rubio | F24D 17/0021 126/614 |
| 2008/0216823 A1 | 9/2008 | Kmetovicz et al. | |
| 2008/0308091 A1 | 12/2008 | Corio | |
| 2010/0018522 A1 | 1/2010 | Schedletzky | |
| 2010/0108055 A1 | 5/2010 | Davis et al. | |
| 2010/0229852 A1 | 9/2010 | Buckley | |
| 2011/0017273 A1 | 1/2011 | Roach et al. | |
| 2011/0073105 A1 * | 3/2011 | Tandon | F24J 2/242 126/663 |
| 2011/0192393 A1 * | 8/2011 | Swift | F24J 2/0444 126/663 |
| 2011/0290235 A1 | 12/2011 | NewDelman | |
| 2011/0303216 A1 | 12/2011 | Lowenstein | |
| 2012/0117986 A1 | 5/2012 | Hammond | |
| 2012/0131941 A1 | 5/2012 | Ackner et al. | |
| 2014/0360492 A1 * | 12/2014 | Kunczynski | F24J 2/24 126/714 |
| 2017/0097175 A9 * | 4/2017 | Winston | F24J 2/12 |

OTHER PUBLICATIONS

"Concentrated solar power", from <<http://en.wikipedia.org/wiki/Concentrated_solar_power>>, May 1, 2012, 7 pages.

"Euro Sun >> Vacuum Solar Systems >> 120", from http://www.euro-sun-solar.de/index.php?id=57&L=1>>, no later than May 23, 2012, 1 page.

"Euro Sun >> Sunstar DF 120/6", from <<http://www.euro-sun-solar.de>>, 2 pages, no later than Jun. 9, 2012.

Brian Mehalic, "Flat-Plate & Evacuated-Tube Solar Thermal Collectors", 7 pages, Aug. & Sep. 2009.

"Non-Pressurized Solar Collector (LQ-HT-A53)", from <<http://czlongquan.en.alibaba.com/product/287314972-50347699/Non_Pressurized_Solar_Collector_LQ_HT_A53_.html>>, no later than Jun. 10, 2012, 3 pages.

"Oventrop evacuated tube solar thermal collector", from http://www.oventrop-us.com/pdf/brochure/OVSOL_evacuated-tube_collector.pdf, Jun. 2010, 7 pages.

"Photovoltaic system", from <<http://en.wikipedia.org/wiki/Photovoltaic_system>>, 12 pages, Jun. 23, 2012.

"Solar Hot Water How Does It Work?", from <<http://solarproducts.podbean.com/2012/04/17/solar-hot-water-how-does-it-work/>>, 3 pages, Apr. 17, 2012.

"Solar thermal collector", from <<http://en.wikipedia.org/wiki/Solar_thermal_collector>>, 9 pages, May 14, 2012.

"Evacuated Tube Collectors", from <<http://www.solarpanelsplus.com/evacuated-tube-collectors/>>, no later than Jun. 8, 2012, 2 pages.

"SolarShine_Expert of Solar Hot Water", from <<http://solarshine.com/solarsystem.htm>>, copyright 2007-2008, 3 pages.

"Parabolic Trough Solar Thermal Collector-Solar Receiver Tube-SOLTECH International", from <<http://www.solar-evacuated-tube.com/solar_product_info_276.html>>, 3 pages, Copyright 2010.

"The Suntrap Evacuated U Tube Solar Collector (U series collector)", from <<http://www.homeimprovementpages.com.au/creative/brochures/223603/brochure_print.pdf>>, 4 pages, no later than Jun. 8, 2012.

"The Tube vs. Flat-Plate", from <<http://homepower.com/article/?file=HP138_pg36_ATE_5>>, Aug./Sep. 2010, 3 pages.

* cited by examiner

HIGH TEMPERATURE DIRECT SOLAR THERMAL CONVERSION

INCORPORATION BY REFERENCE

The present application incorporates by reference the entire content of each of the following: U.S. provisional patent application No. 61/669,057 filed Jul. 7, 2012, U.S. provisional patent application No. 61/771,621 filed Mar. 1, 2013, U.S. provisional patent application No. 61/803,130 filed Mar. 19, 2013. To the extent permitted by applicable law, the present application also claims priority to each of the foregoing incorporated-by-reference applications.

BACKGROUND

Technologies to harness solar energy can be divided broadly into (a) those that convert sunlight to electricity, and (b) those that convert sunlight to heat, which may in turn either be used to generate electricity or be used to heat water or heat living spaces, for example. Photovoltaic systems are an example of technology that converts sunlight into electricity by using solar cells whose electrical characteristics change when exposed to sunlight. Solar thermal collectors are an example of technology that converts sunlight into heat, by absorbing sunlight and transferring resultant heat into water or another working fluid which circulates through the solar thermal collector.

SUMMARY

Some embodiments described herein are directed at the technical problem of efficiently and cost-effectively deriving energy from the sun. Some technical challenges faced are how to provide a solar thermal technology that is capable of producing temperatures high enough to run an efficient heat engine, and how to support safe and easy on-site assembly of a high temperature solar thermal system. Other technical challenges are also addressed herein.

From a system perspective, some embodiments include a manifold and multiple evacuated tubes. Each evacuated tube contains a sunlight absorption surface and a tube fluid guide. The tube fluid guide has a tube fluid supply and a tube fluid return. The manifold contains a manifold fluid supply and a manifold fluid return, with the manifold fluid supply connected to the tube fluid supplies and the manifold fluid return connected to the tube fluid returns. This basic system—a manifold and evacuated tubes—is further characterized in at least one of the following ways, depending on the embodiment:

(System Refinement A) In some embodiments, each fluid guide is a direct flow coaxial flow fluid guide having a fluid return pipe coaxially inside a fluid supply pipe. In addition, the fluid return pipe is stainless steel or another material having a thermal conductivity lower than a copper pipe of the same size and configuration.

(System Refinement B) In some embodiments, each fluid guide is again a direct flow coaxial flow fluid guide having a fluid return pipe coaxially inside a fluid supply pipe. In addition, the fluid return pipe is thermally insulated (e.g., by a sleeve) from the interior of the fluid supply pipe.

(System Refinement C) In some embodiments, each fluid guide is again a direct flow coaxial flow fluid guide having a fluid return pipe coaxially inside a fluid supply pipe. In this refinement, a supply fitting is located at a junction of the manifold fluid supply and the tube fluid supply. A return fitting is located at a junction of the manifold fluid return and the tube fluid return, and the return fitting is contained within a fluid supply.

(System Refinement D) In some embodiments, at least a portion of the manifold fluid return and/or of the associated plumbing is contained within an evacuated manifold chamber. That is, the fluid return and/or associated plumbing passes through a vacuum chamber.

Each of these refined systems is also amenable to further refinements and variations described herein. For example, in some embodiments the evacuated tubes are located on at least two sides of the manifold, namely, in a butterfly arrangement, a radiating spoke arrangement, or another arrangement which includes a central manifold or evacuated tubes on at least two sides of a manifold. In some of these embodiments and other embodiments, the evacuated tubes are in a planar arrangement (rather than a parabolic trough, for example).

In some embodiments, at least a portion of a back side of at least one evacuated tube has been treated with a low emissivity coating. In some, at least one evacuated tube includes a parabolic mirror which reflects thermal loss from the fluid guide and/or thermal loss from a back side of the absorption surface back toward the absorption surface and/or back toward the fluid guide.

In some embodiments, a reflected light portion of the sunlight absorption surface (a side of the surface that is not usually directly exposed to sunlight) has a selective coating which increases sunlight heat absorption and/or which reduces absorber heat loss caused by thermal radiation. In some embodiments, the total area of direct light receiving portions of sunlight absorption surface of evacuated tubes connected to the manifold is at least five square meters. In some, that area is at least ten square meters. In some embodiments, the system can reach an operating temperature without solar concentration, in that the system is free of any mirror or lens which reflects and/or focuses sunlight onto more than ten percent of the sunlight absorption surface of evacuated tubes connected to the manifold. Some embodiments include a motion platform configured to move the manifold and the evacuated tubes together to track the sun to within 45 degrees of the normal to the absorber plane.

With respect to operating temperatures, in some embodiments the system includes a working fluid circulating within the evacuated tubes and the manifold and having an operating temperature of at least 150 degrees centigrade, even though the system is free of any optics which redirect sunlight onto more than ten percent of the sunlight absorption surface of the evacuated tubes. In some variations, the operating temperature is at least 200 degrees centigrade, at least 250 degrees centigrade, or at least 300 degrees centigrade, respectively, depending on the embodiment. Some embodiments include fluid within the manifold and fluid guides, and the manifold fluid return has a clear day 30-minute sunlight exposure stagnant fluid temperature of at least 150 degrees centigrade. In some embodiments, water without antifreeze is the working fluid within the manifold and the fluid guides. In some embodiments, the working fluid is unfrozen over a 16 hour period with an ambient temperature of 0 degrees centigrade and no sunlight reaching the absorber (e.g., during a sufficiently long and cold night). In some, a warming fluid periodically circulates in thermal connection with the working fluid, but that thermal connection has a negligible impact on overall system thermal efficiency.

With respect to direct flow coaxial flow fluid guides, which have a fluid return pipe coaxially inside a fluid supply pipe, in some embodiments the fluid return pipe is made with a material having a thermal conductivity lower than a copper pipe of the same size and configuration. In some, the fluid return pipe is thermally insulated by a sleeve from the interior of the fluid supply pipe. In some embodiments, a supply fitting is located at a junction of the manifold fluid supply and the tube fluid supply, a return fitting is located at a junction of the manifold fluid return and the tube fluid return, and the return fitting is contained within a fluid supply.

Some embodiments include a manifold and evacuated tubes in combination and thermal connection with at least one of the following: a steam engine, a Stirling engine, a Rankine cycle engine, an Ericsson cycle engine, a heat exchanger, a thermal energy storage system, an absorption chiller system, a system which requires an influx of heat of at least 150 degrees centigrade for normal operation.

From a method perspective, some embodiments transform sunlight into contained heat by receiving sunlight on absorber surfaces within an array of evacuated tubes, and allowing a fluid to circulate from a supply within a manifold to respective supplies within each evacuated tube to respective returns within the evacuated tubes to a fluid return within the manifold, thereby transferring heat from the absorber surfaces to the fluid. This basic method—receiving sunlight and circulating fluid—is further characterized in at least one of the following ways for at least one period lasting at least four hours, depending on the embodiment:

(Method Refinement A) isolating within an evacuated manifold chamber fluid which circulated into the manifold from the evacuated tubes;

(Method Refinement B) isolating within an evacuated manifold chamber substantially all (over 90% by volume) fluid which circulates within the manifold;

(Method Refinement C) receiving only unconcentrated sunlight;

(Method Refinement D) receiving sunlight which is at least ninety percent direct sunlight;

(Method Refinement E) receiving sunlight on at least five square meters of absorber surfaces within the evacuated tubes;

(Method Refinement F) receiving sunlight on at least ten square meters of absorber surfaces within the evacuated tubes;

(Method Refinement G) heating the fluid to at least 150 degrees centigrade within the fluid return within the manifold without requiring solar concentration;

(Method Refinement H) heating the fluid to at least 200 degrees centigrade within the fluid return within the manifold without requiring solar concentration;

(Method Refinement I) heating the fluid to at least 250 degrees centigrade within the fluid return within the manifold without requiring solar concentration;

(Method Refinement J) heating the fluid to at least 300 degrees centigrade within the fluid return within the manifold without requiring solar concentration; and/or (Method Refinement K) receiving sunlight that is redirected (namely, reflected and/or concentrated) via imaging optics (e.g., non-anidolic optics) to the front and/or back of the absorber surfaces in addition to direct sunlight received on the absorber front surface.

Each of these refined methods is also amenable to further refinements and variations described herein. For example, some persist one or more of the refinements for at least six hours, not merely four hours. Some combine particular refinements, e.g., D, E and H, or else D, F, and I.

Some embodiments place the fluid in thermal connection with at least one of the following: a steam engine, a Stirling engine, a Rankine cycle engine, an Ericsson cycle engine, a heat exchanger, a thermal energy storage system, an absorption chiller system, a system which requires an influx of heat of at least 200 degrees centigrade for normal operation.

Some embodiments include exposing the evacuated tubes and manifold over a 16 hour period to an ambient temperature of 0 degrees centigrade with no sunlight reaching the evacuated tubes, without the exposure freezing the working fluid.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in a detailed Description. The innovation is defined with claims, and to the extent this Summary conflicts with the claims, the claims should prevail.

DRAWINGS

A description will be given with explicit and implicit reference to the attached drawings. These drawings only illustrate selected aspects of embodiments and thus do not fully determine coverage or scope.

DESCRIPTION

Overview

Figure 1:
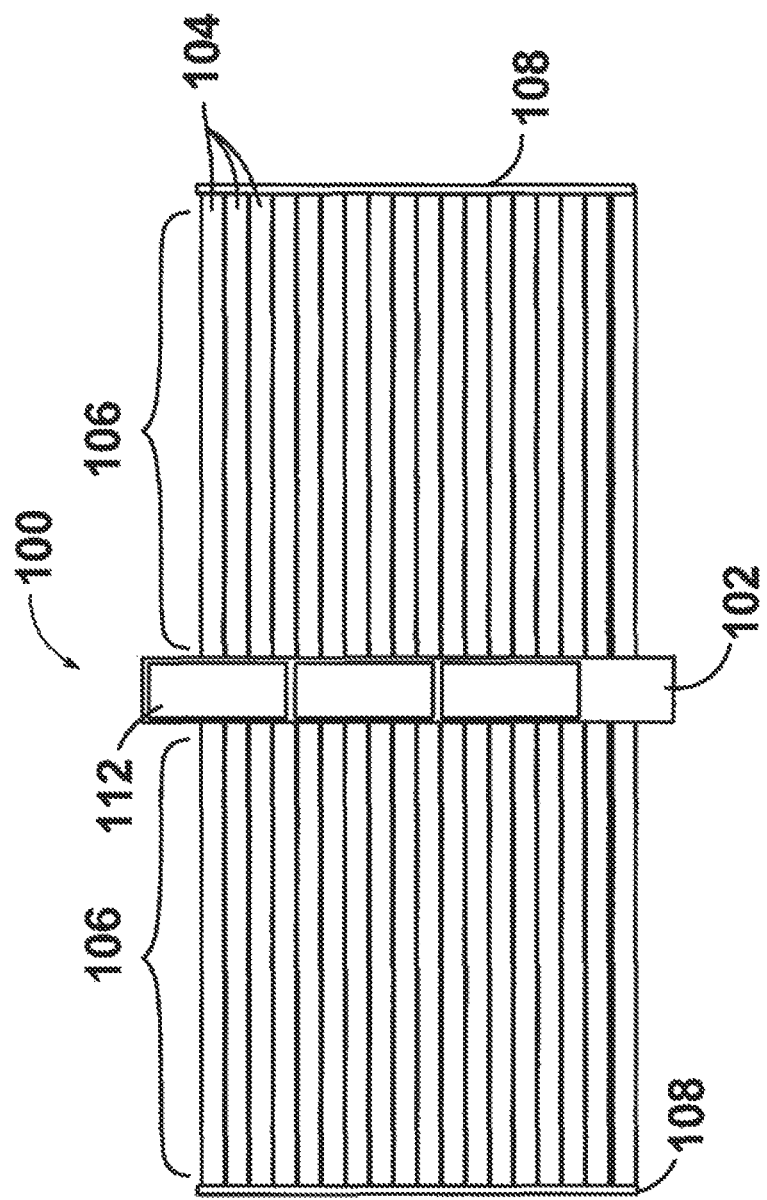
FIG. 1 is a front (sun-facing) view illustrating an embodiment having a butterfly manifold which is closed, with evacuated tubes installed in the manifold.

Although solar energy is abundant and powerful, efficiently and cost-effectively deriving energy from the sun is a challenging task. Currently available solar power generation products are generally limited to a handful of megawatt sized power plants and imported photovoltaic (PV) systems. Conventional smaller concentrated solar power (CSP) systems are entering the market, but their optical systems are complex. These systems are also expensive to produce, install, and maintain, and their optics always introduce some loss in efficiency. Readily available PV systems are expensive while achieving efficiencies of less than 20%.

It would be helpful to have a solar thermal technology that is capable of producing temperatures high enough to run an efficient heat engine without solar concentration through mirrors or lenses. Some embodiments described herein provide aspects of such solar thermal technology. Some embodiments herein provide a high temperature solar thermal system which, combined with a heat engine, offers a locally manufactured solution with the potential to meet or exceed current PV technology's cost per watt through economy of scale production. Many of the embodiments are less complex than conventional CSP, and are suitable for installation from large scale power plants down to residential applications. Related and counterpart methods are also described herein.

Terminology

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

Throughout this document, use of the optional plural "(s)", "(es)", or "(ies)" means that one or more of the indicated feature is present. For example, "tube(s)" means "one or more tubes" or equivalently "at least one tube".

Throughout this document, unless expressly stated otherwise any reference to a step in a method presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement.

Headings are for convenience only. This document's headings are not intended to provide a strict classification of features into embodiment and non-embodiment feature classes, for example, or to exclude definitions or examples not found under a particular heading.

Systems

The examples given herein are merely illustrative. Reference is made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

As illustrated in FIG. 1, some embodiments include a system 100 having a manifold 102 and multiple evacuated tubes 104. FIG. 1 is a front (sun-facing) view illustrating a system 100 having a butterfly manifold 102, with evacuated tubes 104 installed in two arrays 106 on opposite sides of the manifold. Reference numeral 100 refers to a family of embodiments, which may differ in various ways, such as the inclusion or omission of a motion platform, the particular fluid guide configuration used inside evacuated tubes, and other variations discussed herein.

Figure 2:
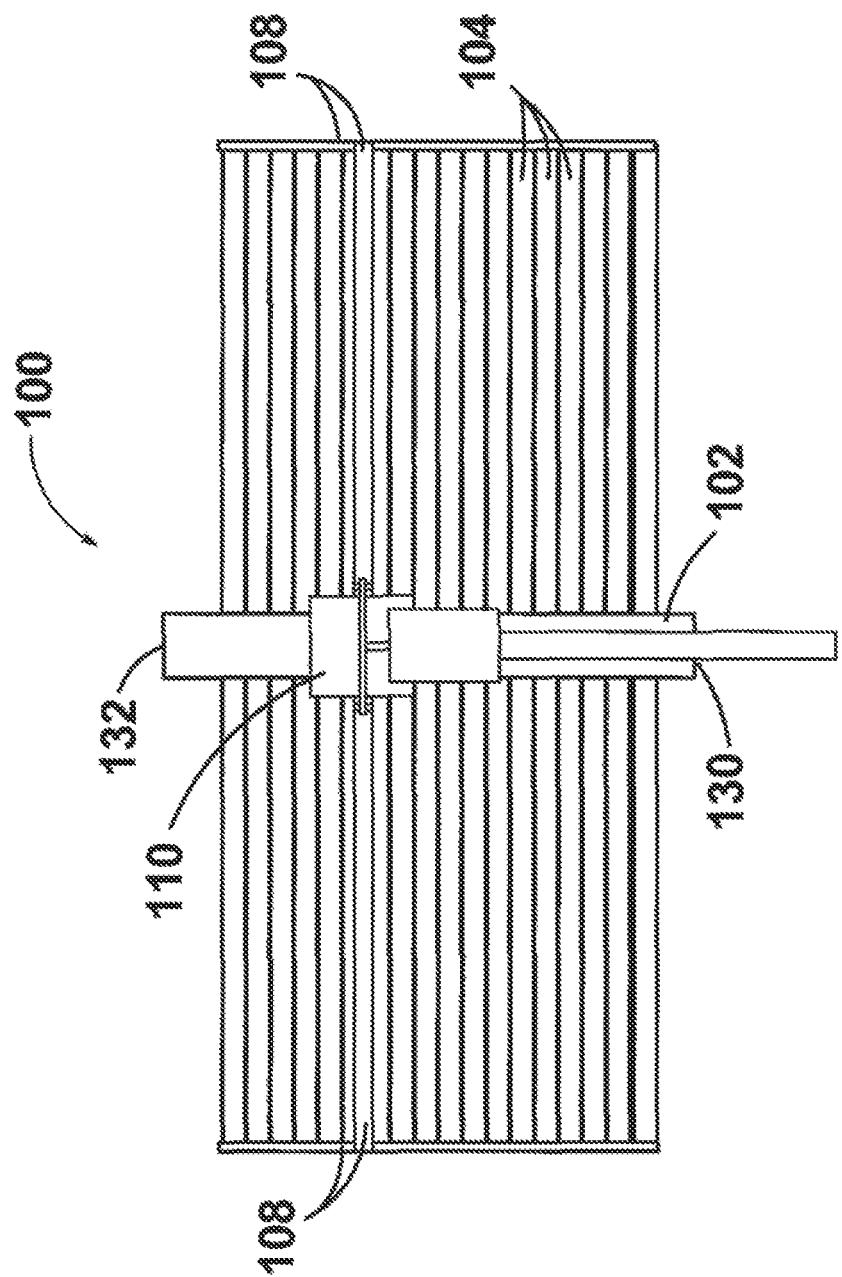
FIG. 2 is a back view of the embodiment illustrated in FIG. 1.
Figure 7:
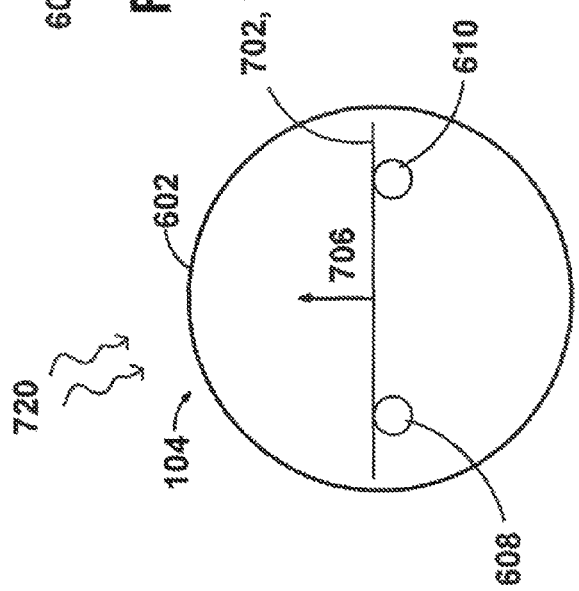
FIG. 7 is a cross-sectional view illustrating a parallel flow evacuated tube.

FIG. 2 is a back view of the embodiment illustrated in FIG. 1. The evacuated tubes are arranged in and physically supported by a rack 108. In the illustrated embodiment, the rack 108 and the manifold 102 are fastened to a motion platform 110, which is motorized and configured to move the manifold 102 and the evacuated tubes 104 together to track the sun. As illustrated in FIG. 7, evacuated tubes contain an absorber plate surface 702 which absorbs solar energy. The absorber surface is generally planar; in the Figures, the physical absorber plate surface 702 coincides with a geometric absorber plane 704. In some embodiments, the motion platform 110 is a two-axis motion platform 110 that tracks the sun to within 45 degrees of a normal 706 to the absorber plane. The absorber plane 704 and the normal 706 to that plane 704 are intangible geometric constructs used to help describe tangible physical constructs discussed herein, such as the absorber surface 702 and the motion platform 110.

Figure 3:
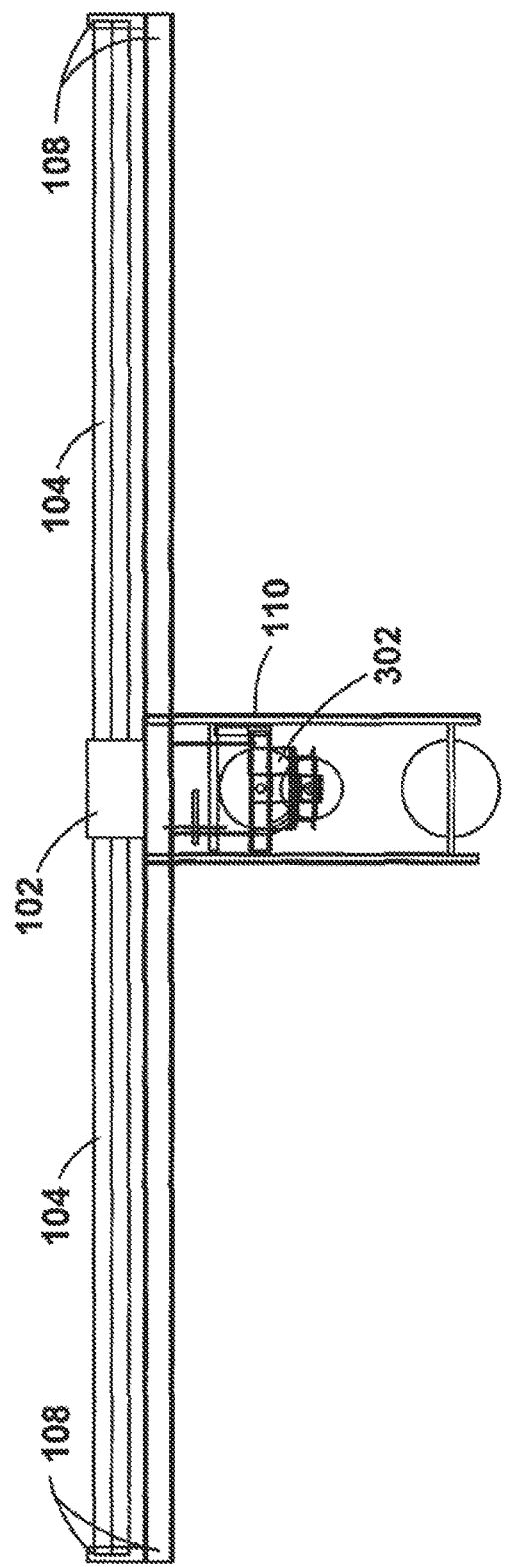
FIG. 3 is a top view of an embodiment having evacuated tubes, a manifold, and a motion platform.
Figure 4:
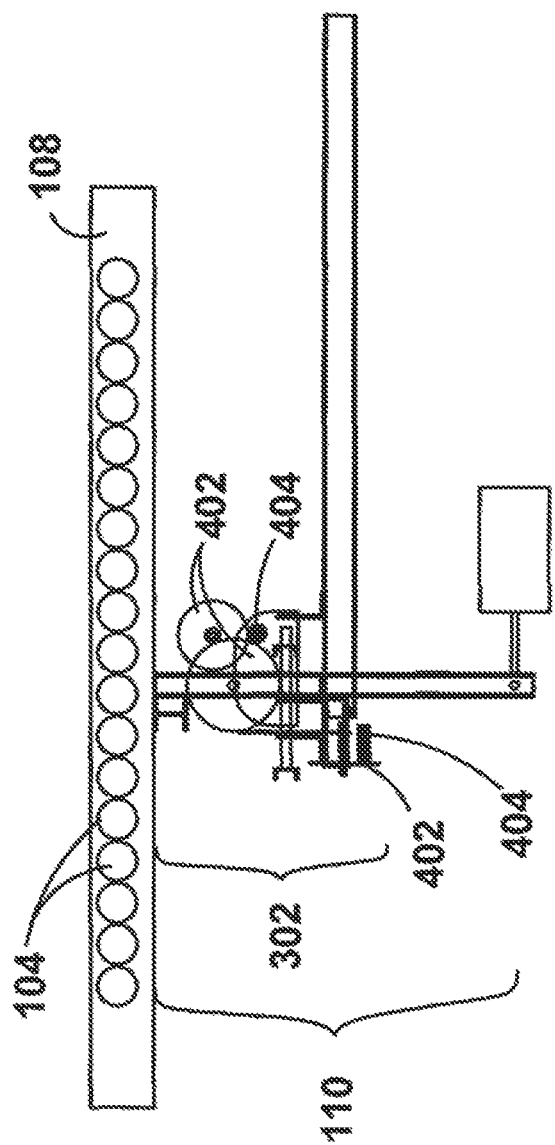
FIG. 4 is a side view of the embodiment illustrated in FIG. 3.

FIG. 3 is a top view of an embodiment having evacuated tubes 104, a manifold 102, and a motion platform 110 which includes an arrangement 302 of gears and a motor. FIG. 4 is a side view of the embodiment illustrated in FIG. 3, further illustrating gears 402 and a motor 404 of the arrangement 302 in the motion platform 110. Any familiar arrangement 302 may be used, such as a two-axis arrangement which moves the rack 108 to track the sun to within 45 degrees of the normal 706 to the absorber plane for at least four hours per day.

Figure 5:
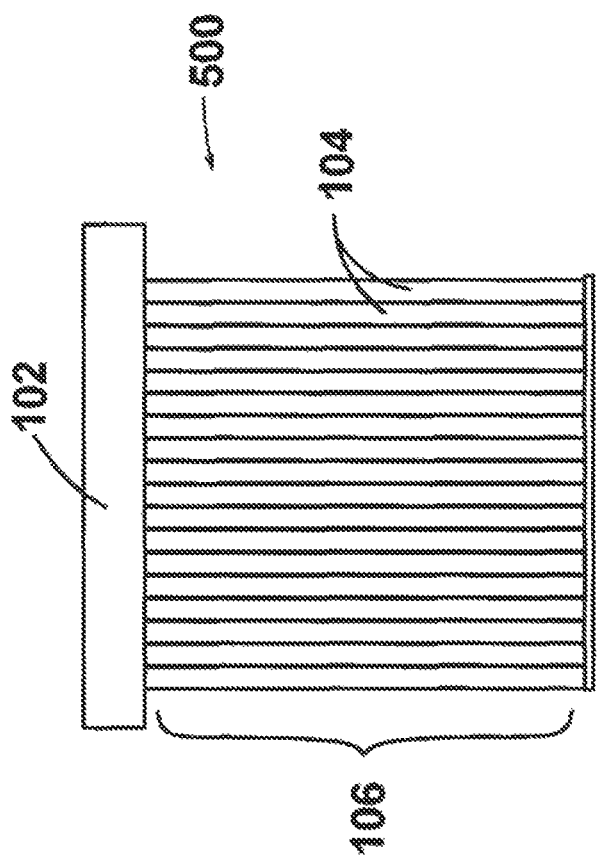
FIG. 5 is a front (sun-facing) view of an alternative embodiment having a single-array (non-butterfly) manifold.

FIG. 5 shows an alternative system 500 having a single array (hence, non-butterfly) manifold 102. Variations are possible with regard to motion platform presence, fluid guide configuration, and so on, within the family of single-array systems 500. In still other embodiments, the evacuated tubes 104 are located in a radiating spoke arrangement (not shown), or in some other arrangement which includes a central manifold or includes evacuated tubes on at least two sides of a manifold.

Figure 6:
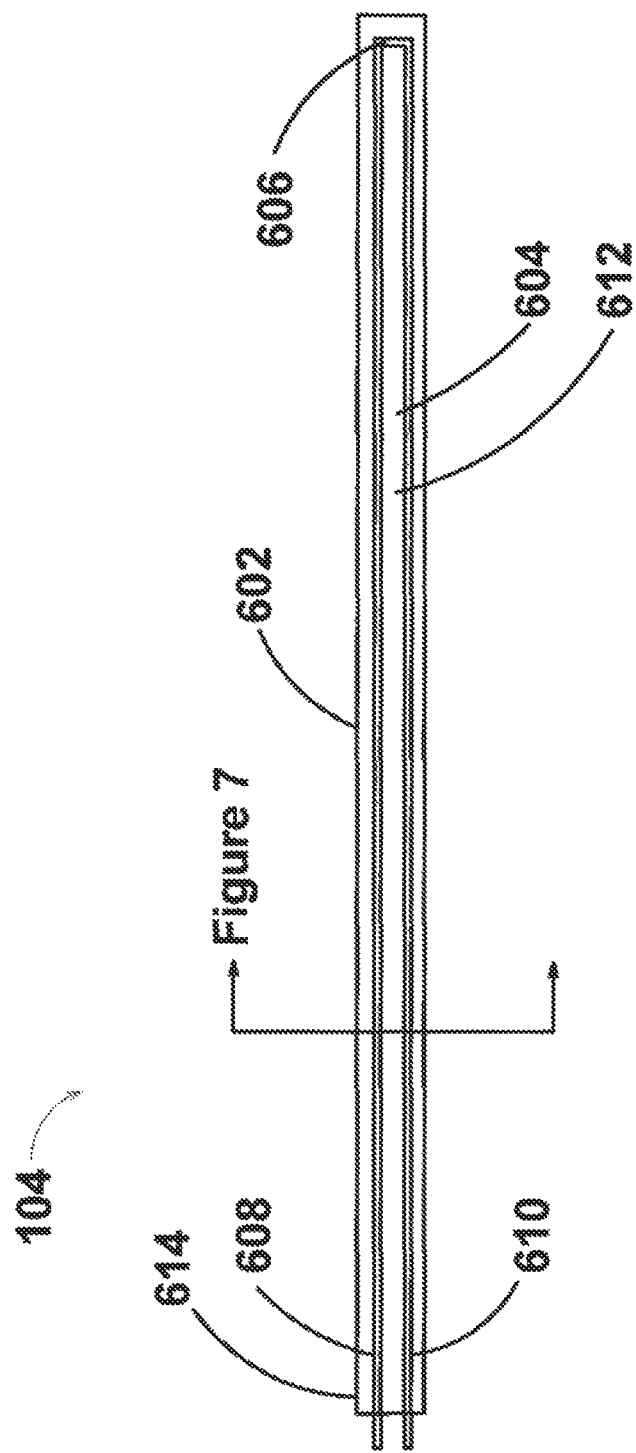
FIG. 6 is a side view illustrating a parallel flow evacuated tube suitable for use in some embodiments.

FIG. 6 is a side view illustrating a parallel flow evacuated tube 104. Some embodiments use only parallel flow evacuated tubes 104, some use only coaxial flow evacuated tubes 104 (shown, for example, in FIGS. 11 and 12), and some embodiments use a mixture of the two flow configurations. For in one embodiment, one side of a butterfly manifold 102 is plumbed for coaxial flow evacuated tubes whereas the other side of the butterfly manifold 102 is plumbed for parallel flow evacuated tubes. In another embodiment, parallel flow tubes 104 and coaxial flow tubes 104 alternate in an array 106.

As illustrated in FIG. 6, an evacuated 104 tube includes a glass tube wall 602 containing plumbing and an absorber plate 604. In some embodiments the plumbing is configured with a U-bend 606 for parallel flow through a fluid supply pipe 608 spaced apart from a parallel fluid return pipe 610, as shown for example in FIGS. 6 through 9. Some other embodiments use coaxial flow plumbing, shown for example in FIGS. 11 and 12, with the supply pipe inside the return pipe, or vice versa. A selective coating 612 is painted or otherwise bonded to one or both sides of the absorber plate 604.

Some embodiments use commercially available evacuated tubes 104, such as the tubes 104 used in a commercially available EuroSun Vacuum-Solar-Systems GmbH (Marburg, Germany) DF120 collector, which is a high vacuum collector with direct flow through. EuroSun is a mark of EuroSun Vacuum-Solar-Systems GmbH. FIGS. 6 and 7 illustrate some design changes to such commercially available evacuated tubes. The altered design uses the same glass cylinder 602, with different piping as described herein; which piping and other differences from a conventional tube 104 are present varies according to the embodiment used. For convenience, reference numeral 104 herein refers to evacuated tubes generally, whether they are commercially available and/or altered in design from commercially available tubes.

Figure 9:
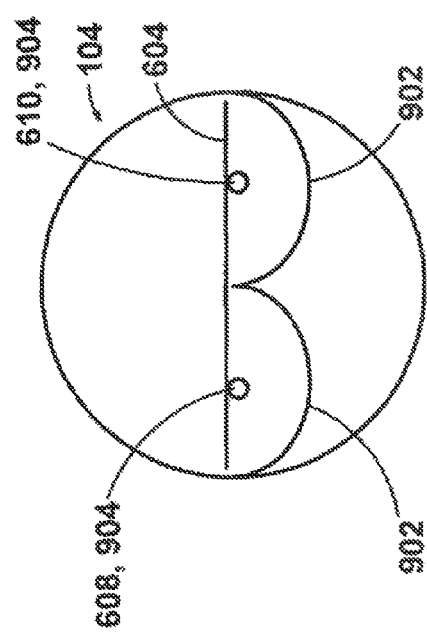
FIG. 9 is a cross-sectional view illustrating a parallel flow evacuated tube with generally parabolic mirrors situated in the tube to reflect thermal radiation losses back toward absorber plate(s)
Figure 8:
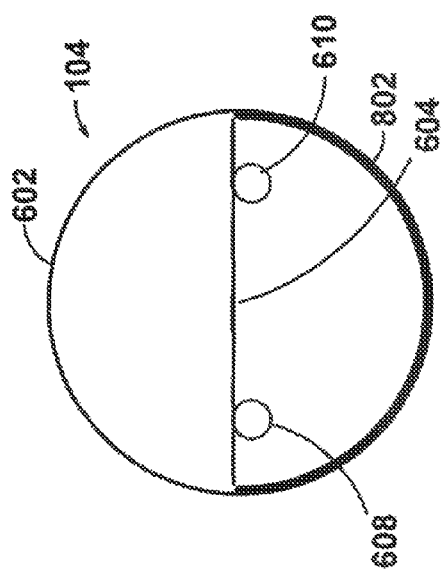
FIG. 8 is a cross-sectional view illustrating a parallel flow evacuated tube with a coating applied to the tube to reflect thermal radiation losses back toward absorber plate(s)

FIG. 7 is a cross-sectional view illustrating a parallel flow evacuated tube 104 receiving sunlight 720. FIG. 8 is a cross-sectional view illustrating a parallel flow evacuated tube with a reflective coating 802 applied to the tube wall 602 to reflect thermal radiation losses back toward absorber plate(s) 604. FIG. 9 is a cross-sectional view illustrating a parallel flow evacuated tube 104 with generally parabolic mirrors 902 situated in the tube to reflect thermal radiation losses back toward absorber plate(s) 604.

More generally, in some embodiments each evacuated tube 104 contains a sunlight 720 absorption surface 702 and a tube fluid guide 904. The tube fluid guide 904 has a tube fluid supply 608 and a tube fluid return 610. As illustrated for example in FIG. 10, a manifold 102 contains a manifold fluid supply 1008 and a manifold fluid return 1010. The manifold fluid supply 1008 is connected for fluid flow to the tube 104 fluid supplies 608 and the manifold fluid return 1010 is connected for fluid flow to the tube 104 fluid returns 610. In some embodiments electrical heat tape and/or another external heat source 1012 is positioned to heat some or all accessible fluid guides, as a precaution to prevent freezing of supply lines 1018 and internal components 1008, 608 during severely cold weather.

Figure 12:
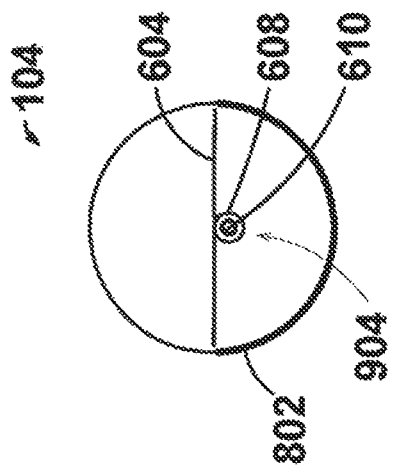
FIG. 12 is a cross-sectional view illustrating a coaxial flow evacuated tube with a coating applied to the tube to reflect thermal radiation losses back toward absorber plate(s)
Figure 11:
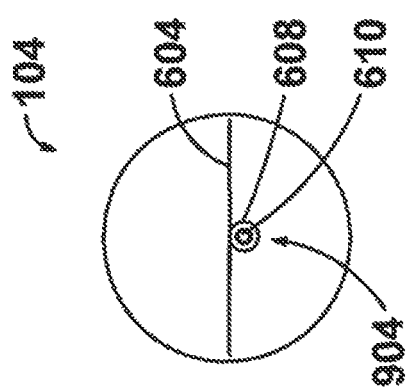
FIG. 11 is a cross-sectional view illustrating a coaxial flow evacuated tube.

FIG. 11 is a cross-sectional view illustrating a coaxial flow evacuated tube 104. In this coaxial configuration, the fluid guide 904 is a direct flow fluid guide having a fluid return pipe 610 located coaxially inside a fluid supply pipe 608. FIG. 12 is a cross-sectional view illustrating a coaxial flow evacuated tube 104, with a reflective coating 802 applied to the tube to reflect thermal radiation losses back toward absorber plate(s) 604.

Figure 13:
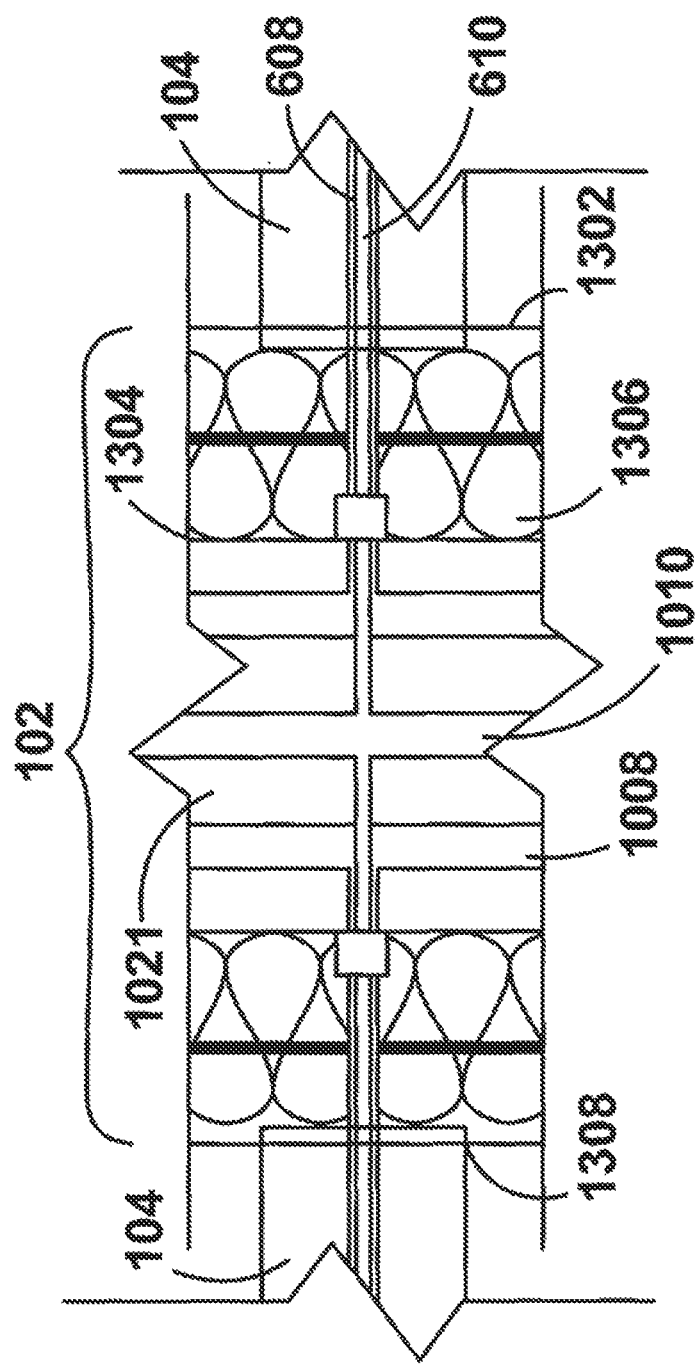
FIG. 13 is a partial cross-sectional view showing part of a coaxial flow evacuated tube and a manifold section with a portion of the manifold cut away for clarity of illustration.

FIG. 13 illustrates a coaxial flow evacuated tube 104 and a manifold 102 section with a portion cut away to show the coaxial plumbing 1008, 1010 inside the manifold 102. The illustrated embodiment includes a housing 1302 around the manifold's plumbing, such as an airtight stainless steel chamber, or another housing allowing the internal portion of plumbing 1008, 1010 to be enclosed in a vacuum to minimize thermal losses. As used herein, "vacuum" means a pressure of 0.5 atm or less, i.e., one-half of one standard atmosphere, or less. In some embodiments, the stainless steel chamber portion of the housing 1302 is further housed in an aluminum box 1304 which is insulated with an aerogel based insulation 1306 to further reduce thermal losses.

Figure 14:
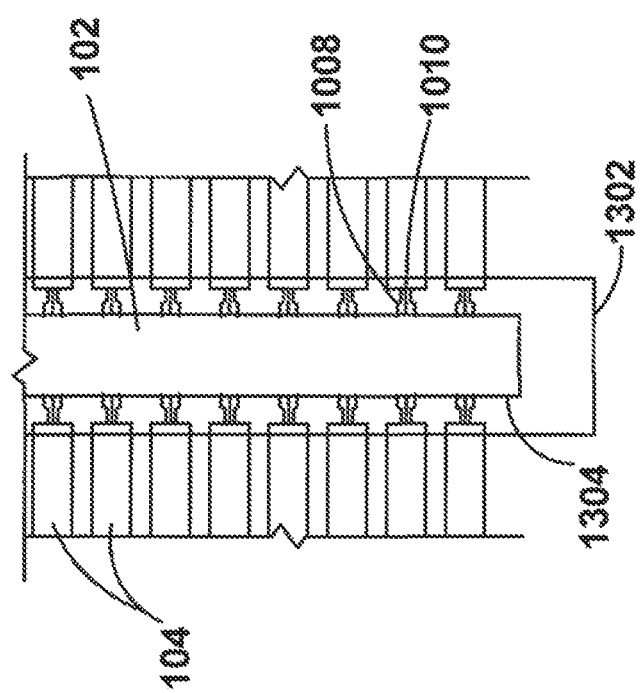
FIG. 14 is a front view illustrating a manifold suitable for use as a component in some embodiments, and suitable to be modified according to teachings herein for some other embodiments, with a portion of a manifold housing box cut away for clarity of illustration.

FIG. 14 further illustrates a manifold 102 which has coaxial plumbing 1008, 1010 connected to evacuated tubes 102. A portion of box 1304 has been removed to help illustrate the connections between evacuated tubes 104 and manifold plumbing 1008, 1010. Use of a housing leaves at most a short section of piping 1008, 1010 exposed, namely, pipe going from the evacuated tube to the evacuated manifold is unprotected by a vacuum in some embodiments. FIGS. 13 and 14 show other embodiments, in which the evacuated tube 102 ends fit into receptacles 1308 in the housing box 1302, so that no piping 1008, 1010 is fully exposed.

Like other reference numerals herein, reference numeral 102 refers to a family of items, not merely to a solitary example. Thus, the same reference numeral 102 is used to refer to the manifold 102 of FIG. 10, which has parallel flow plumbing, as well as to refer to the manifold 102 of FIG. 13, which has coaxial flow plumbing.

Figure 15:
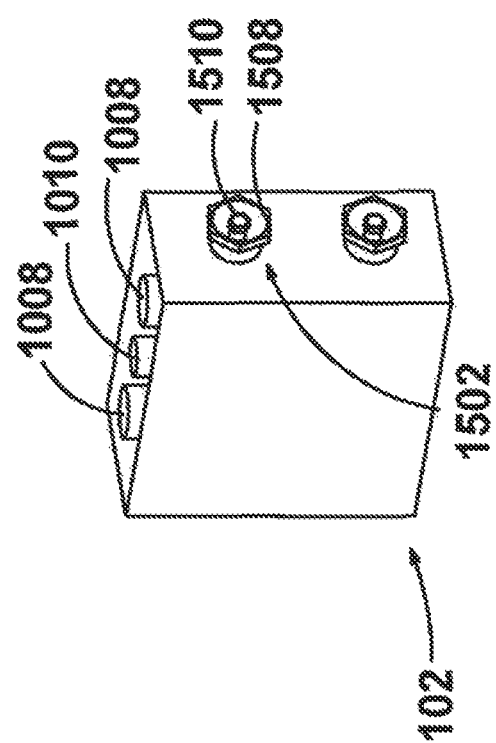
FIG. 15 is a perspective view of a coaxial return-supply fitting and a manifold section according to teachings herein.

FIG. 15 is a perspective view of a coaxial return-supply fitting 1502 (sometimes called a "fitting-in-a-fitting"). In this embodiment, to serve the coaxial arrangement of plumbing in the evacuated tubes (shown, e.g., in FIGS. 11 and 12), the manifold's plumbing includes a supply 1008 on each side of the return 1010. So the array 106 of solar tubes 104 on each side of the manifold 102 will be served in this embodiment by a respective dedicated supply line 1008. Fluid will flow from the manifold supply 1008 through the fitting supply 1508 into the tube supply 608. Likewise, fluid will flow from the tube return 610 through the fitting return 1510 into the manifold return 1010. The fittings 1502 are considered part of the manifold fluid guide 1002 in some embodiments, along with the manifold supply 1008 and manifold return 1010. In other embodiments, the manifold fluid guide 1002 includes the manifold supply 1008 and manifold return 1010 but not the fittings 1502.

Figure 17:
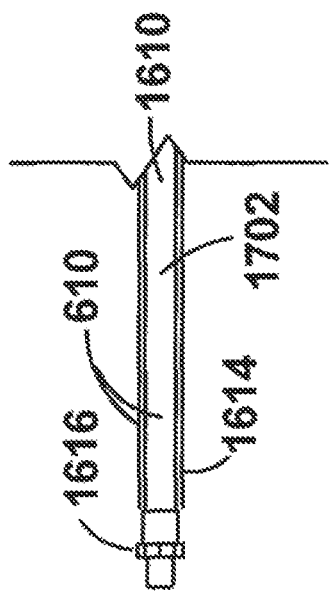
FIG. 17 is a view of an evacuated tube pipe with a sleeve for use in a tube as part of a tube fluid guide.
Figure 16:
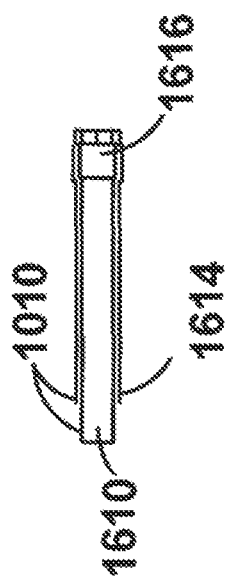
FIG. 16 is a view of a sleeved pipe for use in a manifold as part of a manifold fluid guide.

FIG. 16 shows a portion of a sleeved 1614 pipe 1610 for use in a manifold 102 as part of a manifold fluid guide 1002, such as part of a manifold return 1010. A portion of the sleeve 1614 has been removed in this illustration to show the pipe 1610 within the sleeve 1614, but in practice most if not all of the pipe 1610 would be covered by the sleeve 1614, at least up to the tube fluid guide fittings, in many embodiments. In the illustrated embodiment, the sleeve 1614 extends over a fitting 1616. The sleeved 1614 pipe 1610 can be used in coaxial flow and/or in direct flow plumbing configurations; the fitting 1616 can be a coaxial return-supply fitting 1502 or a parallel flow fitting. FIG. 17 similarly shows a portion of a sleeved 1614 pipe 1610 for use in a tube fluid guide 904, as part of an evacuated tube return 610.

With regard to all Figures, different embodiments can be characterized in various ways. In some, each fluid guide 904, 1002 is a direct flow fluid guide having a fluid return pipe coaxially inside a fluid supply pipe. In some, a tube fluid return pipe 610 and/or manifold fluid return pipe 1010 is stainless steel or another material having a thermal conductivity lower than a copper pipe of the same size and configuration.

In some embodiments, each fluid guide 904, 1002 is a direct flow fluid guide having a fluid return pipe 610, 1010 coaxially inside a fluid supply pipe 608, 1008. In some, the fluid return pipe is thermally insulated (e.g., by a sleeve 1614) from the interior of the fluid supply pipe.

In some embodiments, each fluid guide 904, 1002 is a direct flow fluid guide having a fluid return pipe coaxially inside a fluid supply pipe, and a supply fitting 1508 is located at a junction of the manifold fluid supply 1008 and the tube fluid supply 608. A return fitting 1510 is located at a junction of the manifold fluid return 1010 and the tube fluid return 610. The return fitting 1510 is contained within a fluid supply as shown, for example, in FIG. 13.

In some embodiments, at least a portion of the manifold fluid return and/or associated plumbing is contained within an evacuated manifold chamber, such as a chamber formed by the manifold box 1304 or by the outermost wall of a manifold housing 1302.

It will be appreciated that different evacuated tube 104 embodiments may be used with suitably plumbed manifold 102 embodiments, and that a given installation may include innovative evacuated tube features described herein, innovative manifold features described herein, or both kinds of innovative features. A given installation may also include other innovative features described herein, such as innovative methods of operation, without necessarily including particular manifold 102 or evacuated tube 104 features.

In particular, one of skill will understand that a "coaxial flow" evacuated tube 104 is one having coaxial fluid supply and return pipes, as shown for example in FIGS. 11 and 12, whereas a "parallel flow" evacuated tube 104 is one having a generally u-shaped pipe which enters the tube as the fluid supply at one location and exits the tube at a separate non-coaxial location where the pipe serves as the fluid return, as shown for example in FIGS. 6 through 9. The term "parallel" is not limited to a strict conventional geometric interpretation, but serves rather as a convenient term for distinguishing coaxial flow from an alternative arrangement in which one pipe does not reside within another. Indeed, parallel flow need not even include straight pipe. Also, "coaxial" is not limited to a strict conventional geometric interpretation in which longitudinal axes coincide, but merely indicates that one pipe is inside another pipe. Although piping within the evacuated tube 104 is often in straight sections for coaxial flow and for parallel flow, other shapes such as coils, serpentines, and other paths may also be followed by the fluid within the tube. Coaxial flow tubes and parallel flow tubes are two examples of "direct flow" tubes, as that term is used herein.

Some embodiments include coaxial flow evacuated tubes 104 in fluid connection with a manifold 102 plumbed for coaxial flow evacuated tubes, as shown for example in FIG. 13. Some other embodiments include parallel flow evacuated tubes 104 in fluid connection with a manifold 102 plumbed for parallel flow evacuated tubes, as shown for example in FIG. 10.

Figure 10:
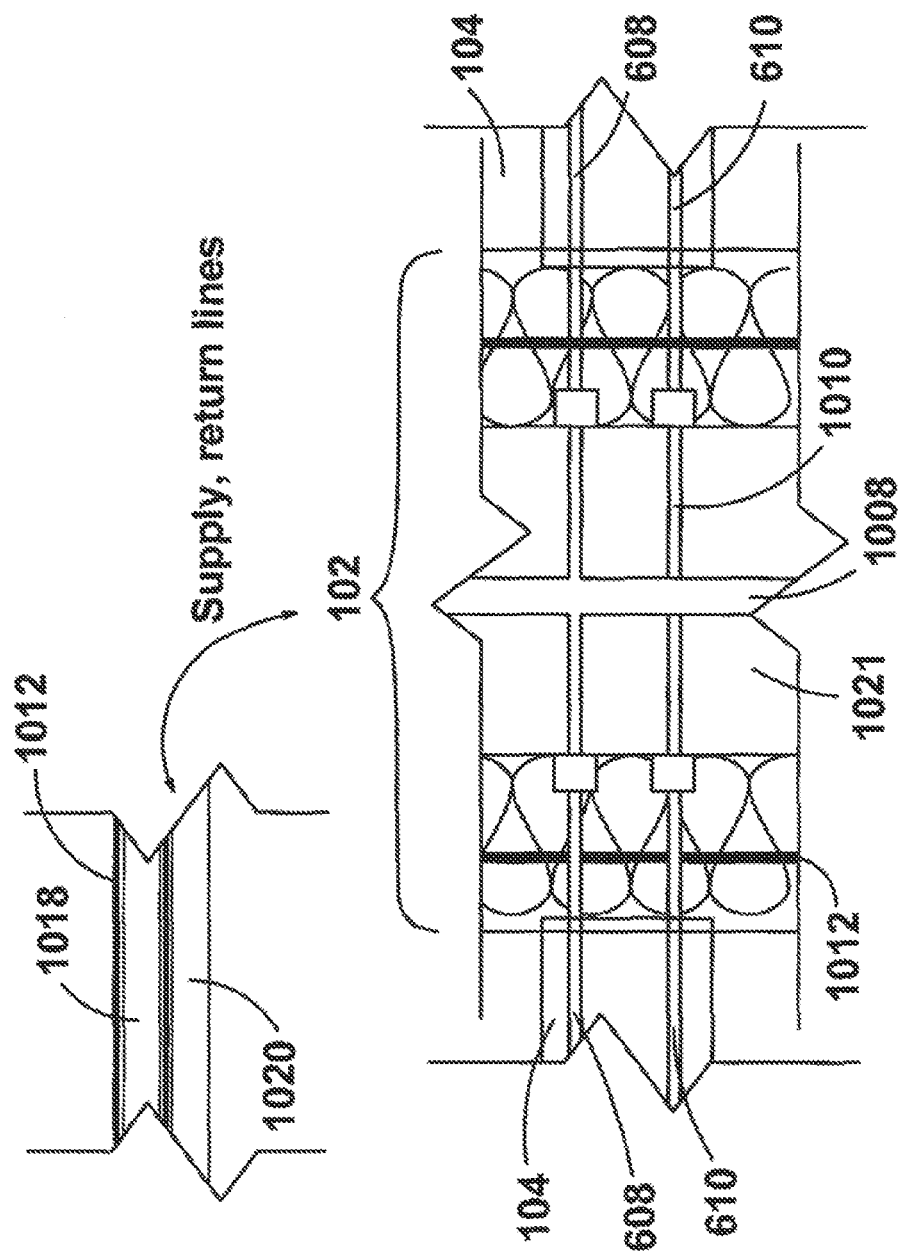
FIG. 10 is a partial cross-sectional view showing part of a parallel flow evacuated tube and a manifold section with a portion of the manifold cut away for clarity of illustration.

A parallel flow manifold is simpler than a coaxial flow manifold, by virtue of having fewer joints and less material. In a parallel flow installation, the evacuated tube 104 includes an independent and separate cold fluid supply 608 and one return hot fluid return line 610, and unlike a coaxial flow approach, the small internal hot fluid return pipe 610 does not pass through the manifold's cold fluid supply 1008. Because direct contact and thus thermal egress from the hot return to the cold supply is no longer a significant concern, both guides (supply and return) can be made from copper and the braided sleeve 1614 used in some coaxial flow embodiments is not employed. The contact surface area between the absorber plate 702 and the fluid guide 904 within the evacuated tube 104 can be more than doubled by using parallel flow, which improves the thermal transfer between the two components 702, 904. FIG. 13 shows fluid flow in a manifold and evacuated tube assembly plumbed for a coaxial flow configuration, and FIG. 10 shows fluid flow in a manifold and evacuated tube assembly plumbed for a parallel flow configuration.

Although some examples herein describe a particular flow, a given embodiment may include direct flow and/or other tubes (e.g., coaxial flow tubes, parallel flow tubes), with corresponding manifold plumbing. Some embodiments include heat pipe tubes in combination with other features described herein. In some embodiments, single-walled evacuated tubes 104 are used, in some double-walled evacuated tubes 104 are used, and some include a mixture of single- and double-walled tubes 104.

In some embodiments, such as those shown in FIGS. 1 through 3, the evacuated tubes 104 are located on at least two sides of the manifold 102. For example, the tubes 104 may be configured in a butterfly arrangement as in FIG. 1, in a radiating spoke arrangement (not shown), or in some other arrangement which includes a central manifold 102, or at least includes evacuated tubes 104 on two sides of a manifold 102.

In some embodiments, photovoltaic panels 112 are positioned over the center manifold area, as illustrated for instance in FIG. 1. Panel 112 power output is used to help power primary and auxiliary components, e.g., motors 404 to track sun movement, heat tape 1012 to prevent freezing in extremely cold weather, and/or safety features such as thermostats with alarms and panel repositioning functionality in motion platform 110 to prevent the system 100 from overheating to the point of damage because of a component failure.

In some embodiments, as illustrated in FIG. 6, a reflected light portion of the sunlight absorption surface 702 has a selective coating 612 which increases sunlight heat absorption and/or which reduces absorber heat loss caused by thermal radiation. In some embodiments, the reflected light portion of the sunlight absorption surface is a side of the surface 702 that is not usually directly exposed to sunlight, e.g., a back side mounted facing away from the sun.

In some embodiments, part or all of a back side (mounted away from the sunlight 720) portion of one or more of the evacuated tubes has been treated with a coating 802 to reflect thermal radiation losses back toward the absorber plate 604 or other absorber surface. One such embodiment is shown in FIG. 8, in a parallel flow tube 104; as illustrated in FIG. 12, coaxial flow tubes 104 may also be treated with such a back-side reflection coating 802. The coating 802 may comprise a conventional low-e (low emissivity) or equivalent coating, such as low-e coatings used on windows. In some embodiments, a low-e coating 802 is deposited on the inside of the tube 104 in the tube's back region corresponding to the position of the absorber plate 604. The coating 802 may be continuous or intermittent. Some familiar evacuated tubes already have a coating like this at a few locations inside the tube, but the coating is there to sacrificially absorb any oxygen that manages to leak into the tube over its lifetime, not to reflect thermal radiation losses back toward the absorber. Thus, some embodiments use this coating 802, or something similar for the full length of the evacuated tube 104, instead of intermittently, and choose the coating 802 on the basis of reflective capability rather than oxygen absorption capability.

As an alternative to coating embodiments like the ones in FIGS. 8 and 12, some embodiments include a parabolic or other curved mirrored surface 902 as illustrated, for example, in FIG. 9. The mirror 902 reflects thermal radiation losses back toward the absorber plate 604 or other absorber surface. One such embodiment is shown in FIG. 9, in a parallel flow tube 104, but coaxial flow tubes 104 may also be configured with a similar single mirror 902. Full coverage behind the collector would be the most effective, but some embodiments provide only partial coverage. The mirror 902 is not necessarily parabolic. Any one or more objects, materials, coatings, and/or devices that will reflect thermal radiation loss and redirect and/or focus at least part of that thermal radiation loss on the fluid tube guide 904 may serve (individually or collectively) as the mirror 902. More generally, any methodology that will reduce infrared radiation losses from the back side of the absorption surface can improve system efficiency at high temperatures.

To further emphasize the ability of embodiments to operate effectively without optics for solar concentration, note that in many embodiments, the evacuated tubes 104 are in a planar arrangement rather than the parabolic trough or other non-planar arrangement often used with solar concentration, for example. Such a planar arrangement is shown, for example, in FIGS. 3 and 4.

In some embodiments, the total area of direct light receiving portions of sunlight absorption surface of evacuated tubes 104 connected to the manifold 102 is at least five square meters. In some, this direct light receiving area is at least ten square meters. In general, the embodiments which do not use tracking tend to have a larger sunlight 720 absorption surface area.

As a result of the large receiving area and other features described herein, some embodiments are capable of reaching an operating temperature without solar concentration. They are free of any mirror or lens which reflects and/or focuses sunlight 720 onto more than ten percent (or 5%, 15%, or 20%, for instance, depending on the embodiment) of the sunlight absorption surface 702 of evacuated tubes 104 connected to the manifold 102.

Some embodiments include a working fluid 1702 circulating within the evacuated tubes 104 and the manifold 102. The working fluid 1702 has a temperature of at least 150 degrees centigrade in one embodiment, and a temperature of at least 200, 250, 275, or 300 degrees, for example, in other respective embodiments. Some of these embodiments are free of any optics which redirect sunlight 720 onto more than ten percent (for instance) of the sunlight absorption surface 702 of the evacuated tubes 104. Some embodiments redirect sunlight 720 to increase the total light hitting the sunlight absorption surface 702 of the evacuated tubes 104 by more than ten percent over the total light that hits with non-redirected sunlight.

In some embodiments, each fluid guide 904, 1002 is a direct flow coaxial flow fluid guide having a fluid return pipe 610, 1010 located inside a fluid supply pipe 608, 1008. In some embodiments, the fluid return pipe is made with a material having a thermal conductivity lower than a copper pipe of the same size and configuration, such as stainless steel. In some embodiments, the fluid return pipe is thermally insulated by a sleeve 1614 from the interior of the fluid supply pipe. For instance a braided fiberglass sleeve 1614 with an acrylic saturant coating is used in some embodiments. In some embodiments, a "fitting-within-a-fitting" 1502 is used. That is, a supply fitting is located at a junction of the manifold fluid supply and the tube fluid supply, a return fitting is located at a junction of the manifold fluid return and the tube fluid return, and the return fitting is contained within a fluid supply.

In some embodiments, at least a portion of the manifold fluid return 1010 is contained within an evacuated manifold chamber 1021. The manifold 102 is vacuum sealed. Some manifold embodiments include an airtight stainless steel chamber 1021 inside an aluminum box 1304 that also contains insulation such as an aerogel. An "aerogel" is a synthetic porous material derived from a gel, in which the liquid component of the gel has been replaced with a gas. In some embodiments, the box 1304 is made of stainless steel instead of aluminum. Other materials could also be used for the box 1304 and/or the chamber 1021 walls, e.g., other metals, plastics, and/or carbon-fiber-reinforced polymer materials.

Some embodiments include a fluid 1702 within the manifold and fluid guides. In some, the manifold fluid return 1010 has a clear day 30-minute sunlight exposure stagnant fluid 1702 temperature of at least 150 degrees centigrade. In some the exposure is 60 minutes or 90 minutes, and the stagnant fluid 1702 temperature is 175 or 200 or 225 degrees, for example for either exposure, depending on the embodiment.

Figure 18:
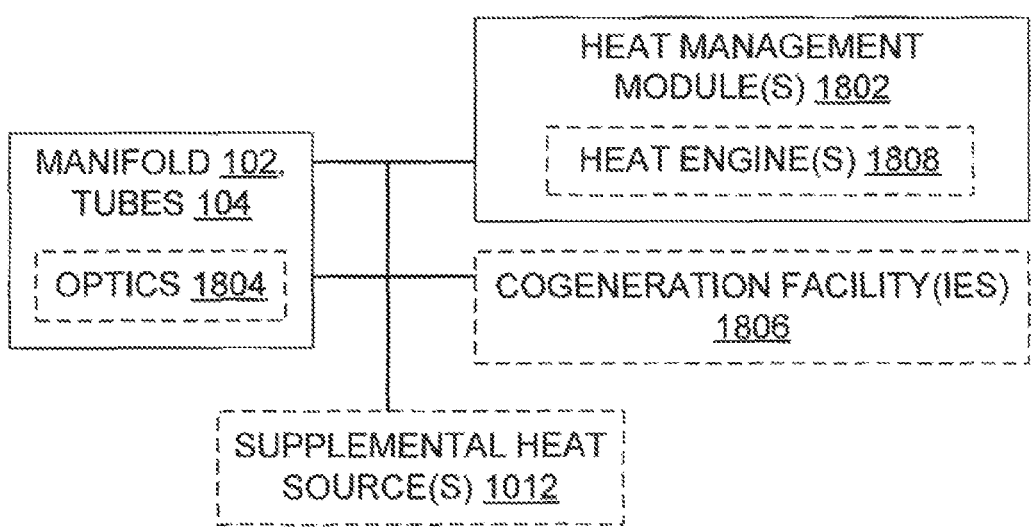
FIG. 18 is a block diagram illustrating a system having a manifold equipped with evacuated tubes, and also having a heat engine.

As illustrated in FIG. 18, some embodiments include the manifold and evacuated tube fluid plumbing in combination and thermal connection with at least one of the following heat management modules 1802: a steam engine, a Stirling engine, a Rankine cycle engine, an Ericsson cycle engine, a heat exchanger, a thermal energy storage system, an absorption chiller system, a system which requires an influx of heat of at least 150/200/250/300 degrees centigrade for normal operation (the required influx depending on the embodiment). In some embodiments, a secondary or supplemental heat source 1012, e.g., from burning a fuel, is added to increase the fluid temperature of the combined system to a higher range, and thus allow a heat engine or other heat management module 1802 to operate in a more efficient power envelope.

Some embodiments include water without antifreeze as a working fluid 1702 within the manifold and fluid guides. In some, the working fluid 1702 is unfrozen over a 16 hour period with an ambient temperature of 0 degrees centigrade and no sunlight 720 reaching the absorber 604, e.g., during a sufficiently long and cold night. In some embodiments, the working fluid 1702 is unfrozen over a 16 hour period with an ambient temperature below 0 degrees centigrade and no sunlight 720 reaching the absorber 604, e.g., during the night, and the system contains as a supplemental heat source 1012 a periodic circulation of a warming fluid in thermal connection with the working fluid, and that thermal connection has a negligible impact on overall system thermal efficiency.

Figure 19:
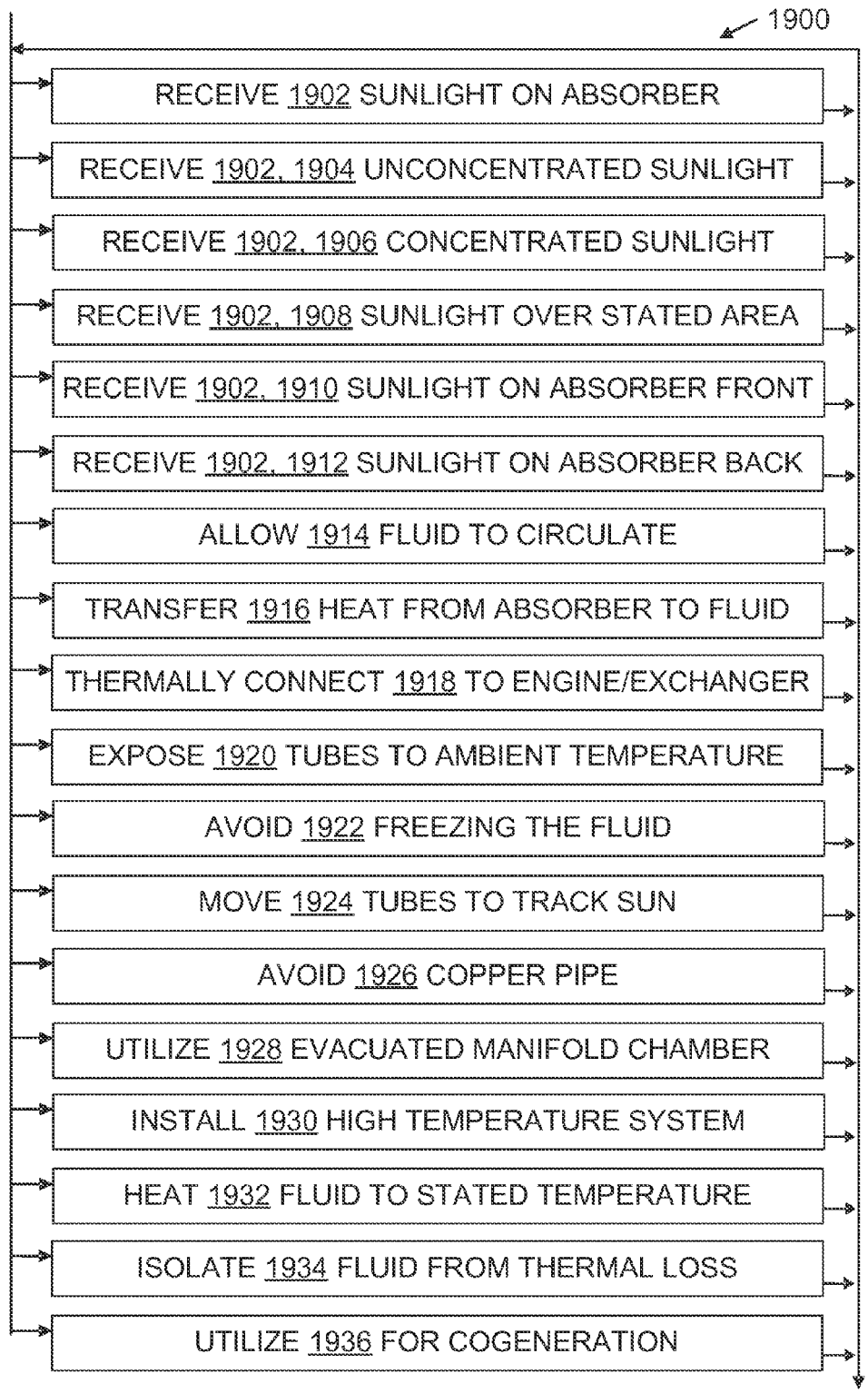
FIG. 19 is a flowchart illustrating steps of some method embodiments.

FIG. 19 illustrates some process embodiments in a flowchart 1900. Processes (a.k.a. methods) shown may be performed in some embodiments automatically. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 19. Steps may be performed serially, in a partially overlapping manner, or fully in parallel. The order in which flowchart 1900 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Some embodiments transform sunlight into contained heat by receiving 1902 sunlight on absorber surfaces 702 within an array of evacuated tubes 104, and allowing 1914 a fluid 1702 to circulate from a supply 1008 within a manifold 102 to respective supplies 608 within each evacuated tube to respective returns 610 within the evacuated tubes to a fluid return 1010 within the manifold. Circulation transfers 1216 heat from the absorber 604 surfaces to the fluid 1702.

Within this context, the transformation is further characterized in different embodiments in various ways, for various periods of time, e.g., at least two hours, four hours, six hours, or eight hours, depending on the embodiment.

In some embodiments, the transformation isolates 1934, within an evacuated manifold chamber 1021, fluid 1702 which circulated into the manifold 102 from the evacuated tubes 104. In some, the transformation isolates 1934 within an evacuated manifold chamber 1021 substantially all (at least 90% by volume) fluid 1702 which circulates within the manifold 102.

In some embodiments, the transformation receives 1904 only unconcentrated sunlight to transform. In some, it receives 1904 sunlight 720 which is at least ninety percent direct sunlight (or 80%, or 75%, depending on the embodiment).

In some embodiments, the transformation receives 1208 sunlight 720 on at least five square meters of absorber surfaces within the evacuated tubes, while in some it receives 1208 sunlight 720 on at least ten square meters of absorber surfaces within the evacuated tubes.

More generally, variations in the evacuated tubes 104, manifold 102, and other system components noted above or elsewhere herein generally have counterparts in steps of the various transformation method embodiments. For instance, some transformation methods place the fluid in thermal connection 1918 with at least one of the following modules 1802: a steam engine, a Stirling engine, a Rankine cycle engine, an Ericsson cycle engine, a heat exchanger, a thermal energy storage system, an absorption chiller system, a system which requires an influx of heat of at least 200 degrees centigrade for normal operation. As another example of counterparts, some transformation methods include exposing 1920 the evacuated tubes and manifold over a 16 hour period to an ambient temperature of 0 degrees centigrade with no sunlight reaching the evacuated tubes 104, and doing so without the exposure freezing 1922 the working fluid 1702.

In some embodiments, the transformation heats 1932 the fluid 1702 to at least 150/200/250/300 degrees centigrade within the fluid return 1010 within the manifold 102 without requiring solar concentration, where the temperature reached varies (150/200/250/300) according to the particular embodiment. Absence of solar concentration may be evident in various ways. For example, some embodiments that do not require solar concentration operate as described without mirrors, lenses, or other optical elements that reflect and/or concentrate sunlight onto the evacuated tube absorber surfaces—instead, the sunlight 720 is direct from the sun, through outer space and the Earth's magnetosphere and atmosphere and the evacuated tube 104 wall, to the absorber plates 604 without artificial path changes. The evacuated tube 104 wall is considered to have negligible effect as a lens.

In some embodiments, however, some solar concentration is used. In some, the transformation method receives 1906 sunlight 720 that is redirected (namely, reflected and/or concentrated) via imaging optics 1804 (e.g., non-anidolic optics) to be received 1910 on the front and/or received 1912 on the back of the absorber plate surfaces in addition to direct sunlight 720 received on the absorber front surface 702.

Some embodiments include a motion platform 110 configured to move 1924 the manifold 102 and the evacuated tubes 104 together, to track the sun to within 45 degrees of the normal 706 to the absorber plane.

Some embodiments use a pipe 608, 610, 1008, 1010 material having a thermal conductivity lower than a copper pipe of the same size and configuration, such as stainless steel. Avoiding 1926 copper pipe increases manufacturing difficulty but reduces thermal loss. In some embodiments, at least a portion of the manifold fluid return 1010 and/or associated plumbing such as fittings is contained within an evacuated manifold chamber 1021. Utilizing 1928 an evacuated (and sometimes insulated) manifold chamber 1021 increases manufacturing difficulty and cost but reduces thermal loss.

Some suitable uses of some embodiments include low cost, high volume cogeneration applications using contemporary and future heat engine technology. Some example cogeneration solar installations in which an embodiment can be utilized 1936 include facilities 1806 such as car washes, public pools, snow melt systems, government buildings, and locations where waste heat usage will improve return on investment (ROI). An example of non-cogeneration solar installations are embodiments used as a viable competitor to photovoltaic (PV) installations, especially as heat engine technology improves and when domestic production is a high priority.

Because sunlight 720 is prevalent in a lot of places and some embodiments include a fairly simple product to install 1930, they provide a good solution for locating a solar power source near facilities 1806 that require heat, ultimately giving a much better payback than traditional CSP and even PV. This is an example of the general concept of cogeneration, which has much broader use and is better known outside of solar applications.

Additional Examples

Various additional details and design considerations are provided below. The features described below or elsewhere herein may be used individually and/or in combination, or not at all, in a given embodiment. Those of skill will understand that implementation details shown in the Figures need not appear in every embodiment. Those of skill will also understand that prototype limitations need not pertain to every embodiment. Nonetheless, although they are not necessarily required to be present here, these details are provided because they may help some readers by providing context and/or may illustrate a few of the many possible implementations of the technology discussed herein.

Some embodiments work with common fluids 1702 such as oil, water, glycol, steam, or molten salt, within the fluid's operating range. After the proposed design changes to the evacuated tubes 104, some embodiments (referred to at times by the inventor's mark 10×Calibur and/or the inventor's mark HESolar) could be used to generate 1936 super critical steam via a heat exchanger in view of the high pressures of the steam. Most, if not all, heat engines 1808 employ a heat exchanger because their working fluid is kept internal to the engine.

Although many embodiments described herein provide relatively high operating temperatures such as 150 to 300 degrees centigrade or higher, some aspects of the innovations described herein may also improve the efficiency of systems and methods that operate at lower temperatures (below 150 centigrade).

For example, an organic Rankine cycle (ORC) engine 1802 typically operates at temperatures low enough to use conventional evacuated tube solar panels and does not require the innovative technology described herein, but may nonetheless have improved efficiency from such innovations. ORC engines sacrifice efficiency/performance for lower temperature input, which has advantages under certain conditions like using conventional evacuated tube based panels.

Some embodiments provide a solar thermal system that is capable of producing temperatures high enough to run an efficient heat engine 1808 without solar concentration. Some of the aspects of the innovative technology which contribute to this capability include: an airtight chamber 1021 around the manifold interior (e.g., a vacuum sealed manifold 102) which stems thermal loss from the manifold; use of stainless steel plumbing instead of the familiar but more thermally conductive copper plumbing; the addition of selective coating 612 to the back of absorber plates 604 to catch sunlight 720 reflected off the roof or other surface under the collector tubes; and use of a butterfly or other large dense array 106 of tubes in a collector with a central manifold 102. Other aspects are also described herein.

Some embodiments use commercial off the shelf raw materials and a proprietary design to provide a solar thermal collector (as shown, e.g., in the Figures) suitable for power generation. Some systems and methods embody one or more of the following design accomplishments. An output of 10 kW single unit output (thermal) is obtained with direct solar exposure before a concentrating solar power (CSP) connection. A ten square meter vacuum enclosed collector 702 area is used, which is forgiving to low quality CSP optics 1804, including architectural, landscape, and geographical based reflective surfaces as optics 1804. A maximum fluid 1702 operating temperature of around 500 degrees centigrade ("around" means plus or minus ten percent) is available, with higher limits also achievable in some cases. In some embodiments, a maximum fluid 1702 operating temperature of around 400 degrees centigrade is available, and in some a maximum fluid 1702 operating temperature of around 300 degrees centigrade is available. Efficient solar energy capture occurs via forty direct flow evacuated tube 104 collectors (0.27 sqm/collector). Negligible thermal losses occur, due to innovative manifold 102 and fluid transfer designs described herein (shown, e.g., in the Figures). An instrumented and computer controlled system is provided, e.g., for sun tracking 1924. Domestic manufacturing via automated processes and/or with minimal to moderately trained labor is feasible. Easy shipping, assembly, and installation are possible even at remote locations by local trades people with minimal training and simple tooling.

PV has a known limitation of less than 20% efficiency, and is significantly worse with lower cost panels. Meanwhile solar thermal can achieve 80% efficiency concurrent with low cost domestic production, while heat engine producers are claiming 10%-60% efficiency, but require higher grade heat.

Some embodiments of the present solar panel 106 design can provide over 10 kW of high grade heat per unit. Some can be fabricated from readily available raw materials. Some are inexpensive to manufacture in high volume. Some can operate without complex and costly high grade CSP optics yet be easily enhanced by simple concentration methods. Moreover, the design of some embodiments makes them well suited for installation at the point of power need.

Some embodiments can efficiently heat a fluid 1702 higher than 300 C (Celsius, a.k.a. centigrade). This translates to an approximately 25% efficiency for generating electricity from a sterling heat engine 1808 before any solar concentration is applied.

Traditional solar concentrators (commonly called CSP) are typically employed to achieve similar outputs but with much greater complexity and higher losses. Using solar thermal for generating electricity has advantages over photovoltaic (PV) in that PV efficiencies can't manage to exceed 20% and the waste heat produced from a heat engine 1808 that is driven by a solar thermal panel 106 can be put to good uses such as heating water and buildings 1806. Because sunlight 720 is prevalent in a lot of places and some embodiments include a fairly simple product to install, they provide a good solution for locating a solar source near facilities 1806 that require heat, ultimately giving a much better payback than traditional CSP and even PV. This is an example of a more general concept called cogeneration, which has much broader use and is better known outside of solar applications. Also, when considering some embodiments described herein in comparison to concentrated solar power one of skill will appreciate that concentrated solar power is ineffective at capturing indirect or diffuse solar energy, whereas the embodiment absorbs diffuse solar energy equally to direct solar energy. Even on a clear day the amount of diffuse light hitting the earth's surface is significant. With clouds and other particulates in the air the diffuse light component increases further and some embodiments can produce usable heat even in cloudy conditions, although not necessarily enough to drive a heat engine.

In some embodiments, the panel 106 collector area itself is more than 10 square meters. CSP on the other hand uses fairly precise optics to focus sunlight on a very small collector, because the smaller size facilitates higher temperatures. Some embodiments can be enhanced via concentrating sunlight but the large surface area of panel(s) 106 is very forgiving to poor quality optics such as architectural, geographic and landscape based features.

Some embodiments include a simple 2-axis motion platform 110 that tracks the sun, see, e.g., FIGS. 2 through 4. By contrast, in CSP more precise tracking is called for.

Some embodiments use forty of the same evacuated tubes 104 used in the EuroSun six tube panel identified above. In this six tube panel, and perhaps in many other cases as well, the manifold is the primary source of heat loss in the panel. Some embodiments include design features to reduce or prevent such heat loss.

In some embodiments, the tubes 104 attach to two sides of the manifold 102 instead of attaching to only one side, e.g., one embodiment includes twenty tubes 104 attached for fluid flow to the left of the manifold 102 and twenty tubes 104 attached for fluid flow to the right of the manifold 102; the manifold itself is generally vertical. This results in a much smaller manifold 102 size in comparison to overall collector 106 area. In some embodiments, the primary fluid input and output pipes are located at the manifold center point (e.g., near motion platform 110 in FIG. 2) where they see less exposure; this contrasts with attachment at each end 130, 132 of a manifold 102. Attachment at the ends of a manifold is done for ganging in commodity products.

In some embodiments, stainless steel is used for all plumbing components that can lead to thermal losses. Although use of copper is common in the industry, copper exhibits a much greater thermal conductivity than stainless steel.

In some embodiments, an arrangement of fittings 1616 allows for easy assembly and disassembly of all large components, while preserving the vacuum enclosures 1021, to facilitate shipping and easy installation. For example, the evacuated tube fluid guides 904 are releasably fitted to the manifold fluid guide 1002, rather than being permanently attached.

EuroSun's evacuated tubes 104, which were used in a prototype by the present inventor, have uncommon features which added to the prototype's capabilities. Such features include a single walled 614 glass cylinder (as opposed to the cheaper two-wall 614 cylinder) which improves solar gain; direct flow (as opposed to the more common heat pipe plumbing), which allows for a higher maximum temperature and eliminates an inefficient heat exchange step; the largest absorber 604 area per tube in the industry (0.268 square meters) giving significant reductions in heat loss per absorber area since heat loss occurs primarily at a small region at the top of each tube (which is also insulated in the prototype with an aerogel insulation 1306).

Some design changes to the Euro Sun evacuated tubes have been requested of Euro Sun by the inventor. One change includes adding a selective coating 612 to the back side of the absorber to reduce thermal radiation losses and allow for absorption of sun light that is being reflected to the back side of the panel 106. Another change includes replacing the coaxial pipe within a pipe fluid flow to a u-shaped pipe (parallel flow) that enters and exits the evacuated tube at separate locations. This will drastically reduce the complexity of the manifold 102 and eliminate thermal transfer between the supply fluid and return fluid. Other changes include adding a reflector on the back side of the absorber, which aids in recovering thermal radiation losses from the back side of the absorber.

In some embodiments, rigid sections of primary supply and return pipes 1018, 1020, which feed and return fluid from the heat engine 1808, are vacuum insulated conduits made from common copper plumbing pipe and fittings.

Some of the panel 106 embodiments described above, when combined with a Sterling engine 1808 under bright sun conditions, can theoretically produce over 3 kW of electrical power with a 25% conversion efficiency.

REFERENCE NUMERALS

Reference has been made to the Figures by reference numerals. For convenience, a listing of such reference numerals is provided below. Any apparent inconsistencies in the phrasing associated with a given reference numeral, in the Figures or in the text, should be understood as simply broadening the scope of what is referenced by that numeral unless expressly indicated otherwise.

Different instances of a given reference numeral in the text or Figures may refer to different embodiments, even though the same reference numeral is used. For example, reference numeral 102 refers to a double-panel manifold in FIG. 1 and to a single-panel manifold in FIG. 5. Likewise, reference numeral 104 refers to a parallel flow evacuated tube in FIG. 7 and to a coaxial flow evacuated tube in FIG. 11.

102 manifold
104 evacuated tube
106 array (a.k.a. panel) of evacuated tubes
108 rack holding evacuated tubes and manifold
110 motion platform
112 photovoltaic panels
130 bottom end of manifold
132 top end of manifold
302 an arrangement of gears and a motor in a motion platform
402 gears in the motion platform
404 motor in the motion platform
602 glass tube wall
604 absorber plate
606 U-bend
608 fluid supply pipe in tube
610 fluid return pipe in tube
612 selective coating on absorber plate
614 evacuated tube cylinder wall(s)
702 absorber plate surface
704 absorber plane
706 normal to absorber plane
720 sunlight
802 reflective coating
902 parabolic mirror
904 tube fluid guide
1002 manifold fluid guide
1008 fluid supply in manifold
1010 fluid return in manifold
1012 electrical heat tape and/or another external heat source
1018 supply line to the manifold, e.g., from heat engine
1020 return line from the manifold
1021 evacuated manifold chamber
1302 housing around the manifold
1304 box within housing
1306 aerogel based insulation or other insulation
1308 tube receptacles in aluminum box
1502 coaxial return-supply fitting
1508 fitting supply
1510 fitting return
1610 sleeved pipe
1614 sleeve
1616 fitting
1702 working fluid
1802 heat management module
1804 optics
1806 cogeneration facility
1808 heat engine

CONCLUSION

Examples are provided herein to help illustrate aspects of the technology, but the specific examples given within this document do not describe all possible embodiments. Embodiments are not limited to the specific implementations, arrangements, materials, fastening techniques, features, approaches, or scenarios provided herein. A given embodiment may include additional or different features, mechanisms, and/or structures, for instance, and may otherwise depart from the examples provided herein.

Although particular embodiments are expressly illustrated and described herein as methods or as systems, it will be appreciated that discussion of one type of embodiment also generally extends to other embodiment types. For instance, the descriptions of methods in connection with FIG. 19 also help describe the operation of systems and articles of manufacture like those discussed in connection with other Figures. It does not follow that limitations from one embodiment are necessarily read into another. In particular, methods are not necessarily limited to the structures and arrangements presented while discussing systems or articles of manufacture.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, or be a mix of features appearing in two or more of the examples. Functionality shown at one location may also be provided at a different location in some embodiments.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

The Abstract is part of the specification. All claims as filed are also part of the specification. Descriptions may be freely moved during prosecution from the claims to the remainder of the specification, or from the portion of the specification above into the claims, without thereby injecting new matter that was not present at filing.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system comprising:
    multiple evacuated tubes, each evacuated tube containing a sunlight absorption surface and a tube fluid guide, the tube fluid guide having a tube fluid supply and a tube fluid return;
    a manifold containing a manifold fluid supply and a manifold fluid return, the manifold fluid supply connected to the tube fluid supplies and the manifold fluid return connected to the tube fluid returns;
    water without antifreeze as a working fluid within the manifold and fluid guides, and wherein the working fluid is unfrozen over a 16 hour period with an ambient temperature below 0 degrees centigrade and no sunlight reaching the absorber (e.g., during the night), and the system contains a periodic circulation of a warming fluid in thermal connection with the working fluid, and that thermal connection has a negligible impact on overall system thermal efficiency; and
    wherein the system is further characterized in at least one of the following ways:
    (a) each fluid guide is a direct flow coaxial flow fluid guide having a fluid return pipe coaxially inside a fluid supply pipe, and the fluid return pipe is stainless steel or another material having a thermal conductivity lower than a copper pipe of the same size and configuration;
    (b) each fluid guide is a direct flow coaxial flow fluid guide having a fluid return pipe coaxially inside a fluid supply pipe, and the fluid return pipe is thermally insulated (e.g., by a sleeve) from the interior of the fluid supply pipe;
    (c) each fluid guide is a direct flow coaxial flow fluid guide having a fluid return pipe coaxially inside a fluid supply pipe, a supply fitting is located at a junction of the manifold fluid supply and the tube fluid supply, a return fitting is located at a junction of the manifold fluid return and the tube fluid return, and the return fitting is contained within a fluid supply;
    (d) at least a portion of the manifold fluid return and/or associated plumbing is contained within an evacuated manifold chamber.

2. The system of claim 1, wherein the evacuated tubes are located on at least two sides of the manifold, namely, in a butterfly arrangement, a radiating spoke arrangement, or another arrangement which includes a central manifold or evacuated tubes on at least two sides of a manifold.

3. The system of claim 1, wherein a reflected light portion of the sunlight absorption surface (a side of the surface that is not usually directly exposed to sunlight) has a selective coating which increases sunlight heat absorption and/or which reduces absorber heat loss caused by thermal radiation.

4. The system of claim 1, wherein the evacuated tubes are in a planar arrangement (rather than parabolic trough, for example).

5. The system of claim 1, wherein the total area of direct light receiving portions of sunlight absorption surface of evacuated tubes connected to the manifold is at least five square meters.

6. The system of claim 1, wherein the system is capable of reaching operating temperature without solar concentration in that the system is free of any mirror or lens which reflects and/or focuses sunlight onto more than ten percent of the sunlight absorption surface of evacuated tubes connected to the manifold.

7. The system of claim 1, wherein the system includes a working fluid circulating within the evacuated tubes and the manifold and having a temperature of at least 200 degrees centigrade, and the system is free of any optics which redirect more than ten percent of the sunlight that is then received on the sunlight absorption surface of the evacuated tubes.

8. The system of claim 1, wherein at least one evacuated tube further incorporates or includes a mirror, or other reflective material, which reflects thermal loss from the fluid guide and/or thermal loss from a back side of the absorption surface back toward the absorption surface and/or back toward the fluid guide.

* * * * *